(12) United States Patent
Tat et al.

(10) Patent No.: US 9,934,564 B2
(45) Date of Patent: Apr. 3, 2018

(54) METHODS AND SYSTEMS TO ANALYZE OPTICAL IMAGES FOR QUANTIFICATION OF MANUFACTURING PART QUALITY

(71) Applicant: The Boeing Company, Chicago, IL (US)

(72) Inventors: Hong Hue Tat, Redmond, WA (US); Mark Daniel Winters, Maple Valley, WA (US); Yuan-Jye Wu, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/228,439

(22) Filed: Aug. 4, 2016

(65) Prior Publication Data

US 2018/0040116 A1 Feb. 8, 2018

(51) Int. Cl.
| | |
|---|---|
| *G06K 9/00* | (2006.01) |
| *G06T 7/00* | (2017.01) |
| *G06K 9/46* | (2006.01) |
| *G06T 7/60* | (2017.01) |
| *G06K 9/52* | (2006.01) |

(Continued)

(52) U.S. Cl.
CPC .......... *G06T 7/0004* (2013.01); *G06K 9/4604* (2013.01); *G06K 9/52* (2013.01); *G06K 9/6201* (2013.01); *G06T 3/60* (2013.01); *G06T 7/0042* (2013.01); *G06T 7/0081* (2013.01); *G06T 7/0085* (2013.01); *G06T 7/60* (2013.01);

(Continued)

(58) Field of Classification Search
CPC ....... H01L 2924/00; G03F 1/84; G03F 7/705; G01B 7/28

USPC ....... 382/141, 143, 144, 145, 147, 149, 152, 382/209, 278; 348/86, 87

See application file for complete search history.

(56) References Cited

U.S. PATENT DOCUMENTS

| | | | | | |
|---|---|---|---|---|---|
| 7,123,981 | B2 * | 10/2006 | Dollevoet | ......... | A61F 13/15772 700/124 |
| 7,162,319 | B2 * | 1/2007 | Popp | ................ | A61F 13/15772 493/11 |

(Continued)

OTHER PUBLICATIONS

"Analysing the Structure of CFRP Components", Jun. 19, 2015, http://www.azom.com/article.aspx?ArticleID=12157.

(Continued)

*Primary Examiner* — Yosef Kassa (74) *Attorney, Agent, or Firm* — McDonnell Boehnen Hulbert & Berghoff LLP (57) ABSTRACT

Example systems and methods are described for validating a manufacturing tolerance of a structure. A method includes receiving a digital image of a cross-section of the structure at an interface of a computing device, identifying an outer boundary of the structure from the digital image, selecting a region of the outer boundary based on changes in a first derivative or a second derivative of points of the outer boundary, identifying a geometry feature of the region of the outer boundary by comparison to stored templates of geometry features of the structure, making a comparison of the geometry feature of the region of the outer boundary to a manufacturing specification for a corresponding portion of the structure, and determining whether the structure is within a manufacturing tolerance based on the comparison of the geometry feature to the manufacturing specification.

18 Claims, 9 Drawing Sheets

(51) Int. Cl.
  *G06K 9/62* (2006.01)
  *G06T 3/60* (2006.01)
(52) U.S. Cl.
  CPC ........... *G06K 2009/4666* (2013.01); *G06T 2207/20112* (2013.01); *G06T 2207/30108* (2013.01)

(56) References Cited

U.S. PATENT DOCUMENTS

| | | | | |
|---|---|---|---|---|
| 7,366,321 | B2* | 4/2008 | Usikov | G06K 9/4642 382/100 |
| 7,587,704 | B2* | 9/2009 | Ye | G03F 7/70441 378/35 |
| 7,617,477 | B2* | 11/2009 | Ye | G03F 7/70441 716/56 |
| 7,681,159 | B2* | 3/2010 | Matsuoka | G06F 17/5081 382/144 |
| 7,809,179 | B2* | 10/2010 | Singh | A61F 13/15772 348/92 |
| 8,217,351 | B2* | 7/2012 | Toyoda | H01L 22/12 250/306 |
| 8,355,562 | B2* | 1/2013 | Toyoda | G06K 9/00 382/147 |
| 8,492,178 | B2* | 7/2013 | Carlson | G01N 21/9501 438/16 |
| 2014/0333758 | A1 | 11/2014 | Wu et al. | |

OTHER PUBLICATIONS

Liu, Diane Suk-Ching, "Analysis of Measurements of Defects in Multiaxial Warp Knitted Fabrics for CFRP Composites," B.Eng. Ryerson University, 2008, pp. 1-156.

* cited by examiner

METHODS AND SYSTEMS TO ANALYZE OPTICAL IMAGES FOR QUANTIFICATION OF MANUFACTURING PART QUALITY

FIELD

The present disclosure relates generally to methods for validating a manufacturing tolerance of a structure, and more particularly to measuring features of a part from photomicrographs, such as geometry or wrinkles, to validate manufacturing requirements.

BACKGROUND

Validation of manufacturing processes often requires destructive inspection of a part of interest. In this validation, typically a representative part will be manufactured and several physical cuts will be made throughout the part. A number of cuts can be on the order of thousands depending on a size of the part. The cuts are recorded in a form of high resolution optical images. These images, called photomicrographs, are typically then viewed by a human and conclusions on quality of the part are made based on human measurement of various features, such as wrinkles or radii in the images.

Manual measurements of various features in the images have several drawbacks including training employees on how to make the measurements, as well as variability in measurement consistency and quality by different people or the same person. Furthermore, manually assessing the images to determine conformance of surface contours of a part to a specification is both subjective and labor intensive.

What is needed is a process for analyzing the photomicrographs that can reduce an amount of time associated with human interpretation of the photomicrographs, and also remove the variability in the measurements that can arise with human interpretation.

SUMMARY

In one example, a method of validating a manufacturing tolerance of a structure is described. The method comprises receiving a digital image of a cross-section of the structure at an interface of a computing device, identifying, by the computing device, an outer boundary of the structure from the digital image, selecting, by the computing device, one or more regions of the outer boundary based on changes in a first derivative or a second derivative of one or more points of the outer boundary, identifying a geometry feature of the one or more regions of the outer boundary by comparison to stored templates of geometry features of the structure, making a comparison, by the computing device, of the geometry feature of the one or more regions of the outer boundary to a manufacturing specification for a corresponding portion of the structure, and determining, by the computing device, whether the structure is within a manufacturing tolerance based on the comparison of the geometry feature to the manufacturing specification.

In another example, a non-transitory computer readable storage medium is described that has stored therein instructions, that when executed by a computing device having one or more processors, causes the computing device to perform functions. The functions comprise receiving a digital image of a cross-section of the structure at an interface of a computing device, identifying, by the computing device, an outer boundary of the structure from the digital image, selecting, by the computing device, one or more regions of the outer boundary based on changes in a first derivative or a second derivative of one or more points of the outer boundary, identifying a geometry feature of the one or more regions of the outer boundary by comparison to stored templates of geometry features of the structure, making a comparison, by the computing device, of the geometry feature of the one or more regions of the outer boundary to a manufacturing specification for a corresponding portion of the structure, and determining, by the computing device, whether the structure is within a manufacturing tolerance based on the comparison of the geometry feature to the manufacturing specification.

In another example, a system for validating a manufacturing tolerance of a structure is described. The system comprises one or more processors, and data storage storing instructions executable by the one or more processors for performing functions. The functions comprise receiving a digital image of a cross-section of the structure, identifying an outer boundary of the structure from the digital image, selecting one or more regions of the outer boundary based on changes in a first derivative or a second derivative of one or more points of the outer boundary, identifying a geometry feature of the one or more regions of the outer boundary by comparison to stored templates of geometry features of the structure, making a comparison of the geometry feature of the one or more regions of the outer boundary to a manufacturing specification for a corresponding portion of the structure, and determining whether the structure is within a manufacturing tolerance based on the comparison of the geometry feature to the manufacturing specification.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Example systems and methods are described for validating a manufacturing tolerance of a structure. In some instances, features of geometry of the structure are measured based on analyzing digital images of a cross-section of the structure to validate manufacturing requirements. Example systems and methods described for analyzing the digital images can reduce a large amount of time associated with human interpretation of the digital images, and also removes variability in measurements that can arise with human interpretation. An example method includes receiving a digital image of a cross-section of the structure at an interface of a computing device, identifying an outer boundary of the structure from the digital image, selecting one or more regions of the outer boundary based on changes in a first derivative or a second derivative of one or more points of the outer boundary, identifying a geometry feature of the one or more regions of the outer boundary by comparison to stored templates of geometry features of the structure, making a comparison of the geometry feature of the one or more regions of the outer boundary to a manufacturing specification for a corresponding portion of the structure, and determining whether the structure is within a manufacturing tolerance based on the comparison of the geometry feature to the manufacturing specification.

Figure 1:
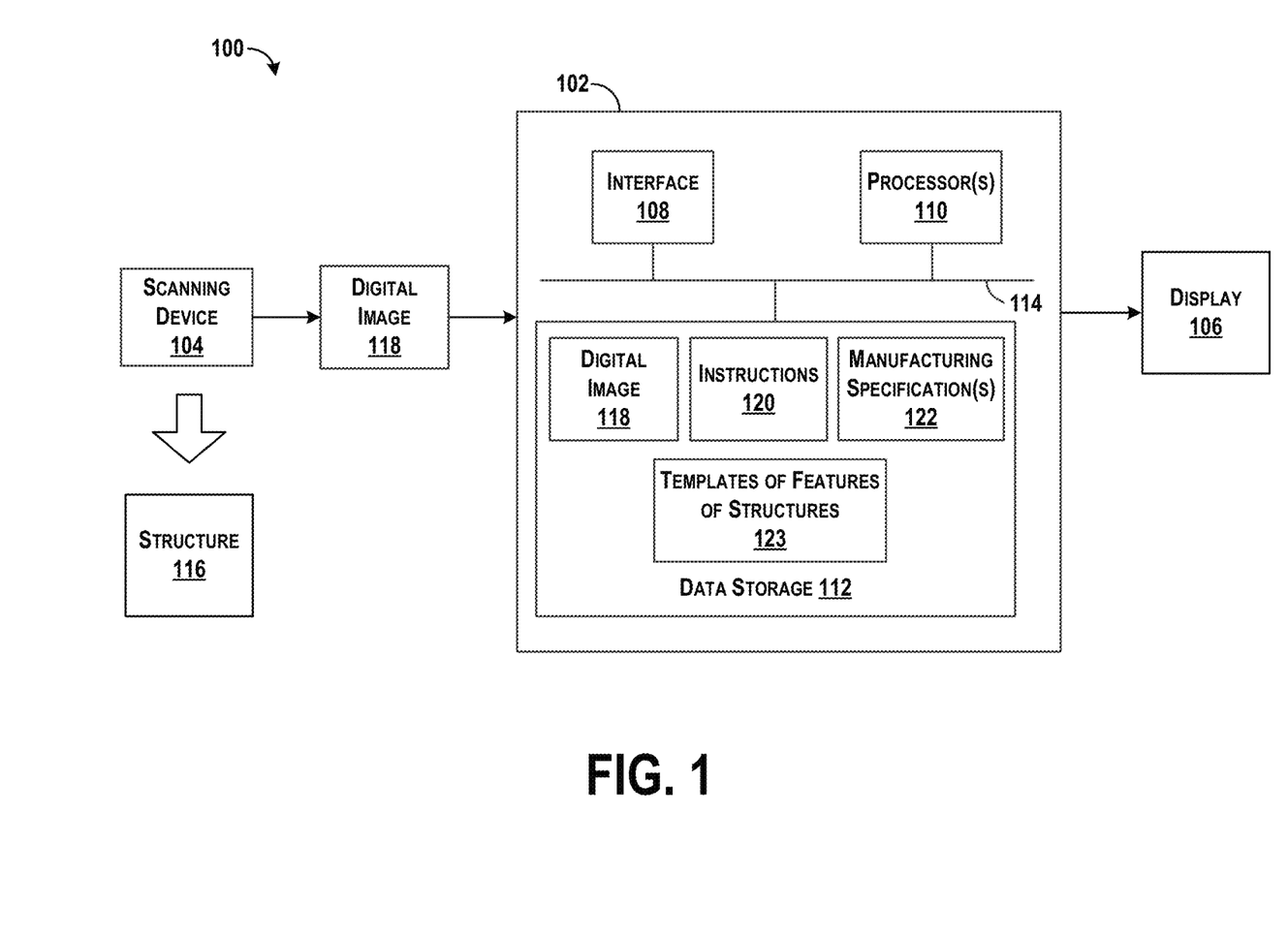
FIG. 1 is a block diagram of an example system for validating a manufacturing tolerance of a structure, according to an example embodiment.

Referring now to the figures, FIG. 1 is a block diagram of an example system 100 for validating a manufacturing tolerance of a structure 116. The system 100 includes a computing device 102, a scanning device 104, and a display 106. The system 100 can be used to perform validation of manufacturing processes for any number or types of structures.

The computing device 102 includes an interface 108, one or more processor(s) 110, data storage 112, and a communication link 114. The computing device 102 may also include hardware to enable communication within the computing device 102 and between the computing device 102 and another computing device (not shown), such as a server entity. The hardware may include transmitters, receivers, and antennas, for example.

The scanning device 104 is operable for optically scanning the structure 116 to create a digital image 118 of the structure. Within some examples, the scanning device 104 may be a component of the computing device 102.

The structure 116 may take a variety of forms, and can include, for example, a plurality of plies, as well as a top and bottom surfaces. Each ply may include a plurality of carbon fibers embedded in a polymer matrix. More specifically, plies can include fibers arranged in a first direction, and fibers arranged in a second orientation different from the first direction, such as substantially perpendicular to the second orientation. Alternatively, fibers of each ply may be arranged in many orientations, and the methods and systems described herein can be utilized to verify manufacturing specifications of the structure 116. Thus, the structure 116 can include a composite structure. The structure 116 may also include a metallic structure or other materials as well.

The scanning device 104 thus scans the structure 116 to create the digital image 118 of the structure 116, and the scanning device 104 sends the digital image 118 to the computing device 102 for processing. The structure 116 that is scanned may be a coupon, or a portion, of a finished composite structure part. In one example, the finished composite structure part is cut into many pieces, and a cross-section of the structure 116 is optically scanned.

The interface 108 receives the digital image 118 from the scanning device 104. The interface 108 allows the computing device 102 to communicate with another computing device (not shown), such as a server. Thus, the interface 108 may be configured to receive input data from one or more devices, and may also be configured to send output data to other devices. In some examples, the interface 108 may also maintain and manage records of data received and sent by the computing device 102. The interface 108 may also include a receiver and transmitter to receive and send data. In other examples, the interface 108 may also include a user-interface, such as a keyboard, microphone, touch-screen, etc., to receive inputs as well.

The processor(s) 110 may receive inputs from the interface 108, and process the inputs to generate outputs that are stored in the data storage 112 and output to the display 106.

The data storage 112 is a non-transitory computer readable storage medium, and instructions 120 are stored thereon. The instructions 120 include computer executable code. When the instructions 120 are executed by the computing device 102 that has the one or more processor(s) 110, the computing device 102 is caused to perform the functions. Such functions include measuring features of the structure 116, such as geometry or wrinkles, based on analyzing the digital image 118 to validate manufacturing requirements. Example systems and methods described for analyzing the photomicrographs or digital images can reduce a large amount of time associated with human interpretation of the photomicrographs, and also removes variability in measurements that can arise with human interpretation.

In one example, the processor(s) 110 execute the instructions 120 to receive the digital image 118 of a cross-section of the structure 116, identify an outer boundary of the structure 116 from the digital image 118, select one or more regions of the outer boundary based on changes in a first derivative or a second derivative of one or more points of the outer boundary, identify a geometry feature of the one or more regions of the outer boundary by comparison to stored templates of geometry features of the structure 116, make a comparison of the geometry feature of the one or more regions of the outer boundary to a manufacturing specification for a corresponding portion of the structure, and determine whether the structure 116 is within a manufacturing tolerance based on the comparison of the geometry feature to the manufacturing specification. For the comparison, the processor(s) 110 may access the data storage 112 to retrieve manufacturing specification(s) 122 that indicate specific design constraints for the structure 116. The processor(s) 110 further execute the instructions 120 for verifying that a geometry of a surface contour of the structure 116 substantially matches the manufacturing specification(s) 122 for the structure 116. The processor(s) 110 may further execute the instructions 120 to identify a geometry feature of regions of an outer boundary of the structure by comparison to stored templates 123 of geometry features of the structure 116, for example. Each of these functions is described more fully below.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 2:
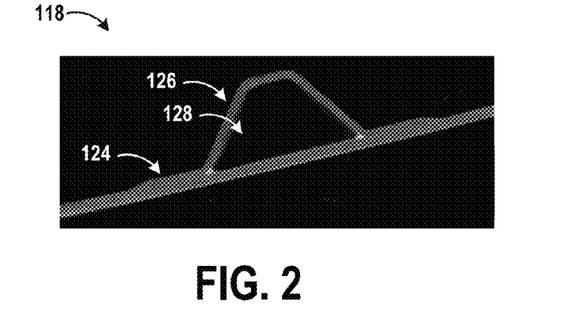
FIG. 2 illustrates an example of the digital image of a cross-section of the structure, according to an example embodiment.

FIG. 2 illustrates an example of the digital image 118 of a cross-section of the structure 116. In this example, the structure 116 is a composite resin stringer 124 that comprises a multi-ply layup of cured prepreg. In the illustrated arrangement, the stringer 124 comprises a hat section 126 forming an internal stringer cavity 128, as well as laterally extending flange sections.

The digital image 118 is processed by the processor(s) 110 to identify an outer boundary of the structure 116 from the digital image 118. In one example, the digital image 118 is transformed into a binary image so that contours can be identified. The cross-sectional representation of the structure 116 in the digital image 118 is a scan image that has a plurality of intensities or values (e.g., 256 values of gray-scale), and from this, a binary image is generated that has other intensities or values that are fewer than the plurality of values (e.g., 2 values: black and white).

Figure 3:
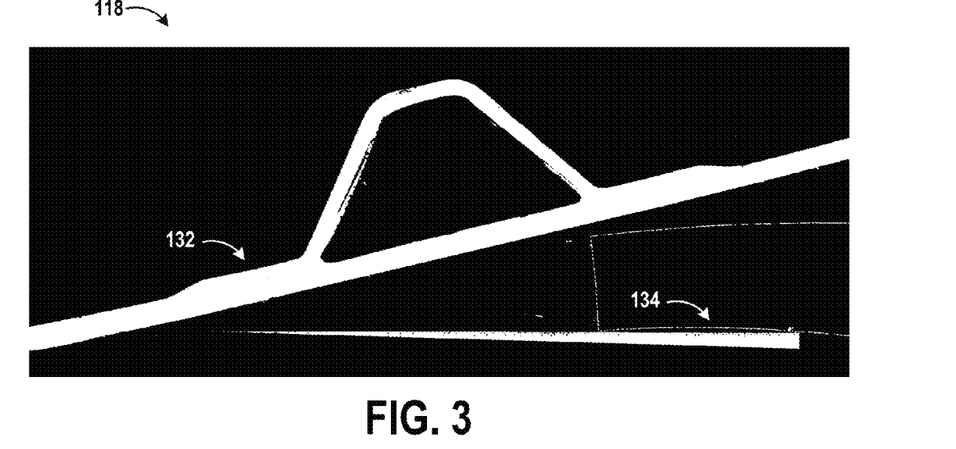
FIG. 3 illustrates an example binary image generated from the digital image that illustrates an outer boundary of the structure, according to an example embodiment.

FIG. 3 illustrates an example binary image 130 generated from the digital image 118 that illustrates an outer boundary 132 of the structure 116. The binary image 130 is generated replacing all pixels in the digital image 118 with a luminance greater than a threshold level with a value 1 (white) and replaces all other pixels with the value 0 (black). In this example, those pixels that include the structure 116 will be thresholded to white and all others to black. As a result, the outer boundary 132 of the structure 116 can be seen, as shown in FIG. 3. The outer boundary 132 is an outline of an outer surface of the structure 116, and in some areas, an inner surface in which cavities are present. There are further artifacts seen in FIG. 3 as well, such as artifact 134, which results from possible objects or other items in the digital image 118.

Figure 4:
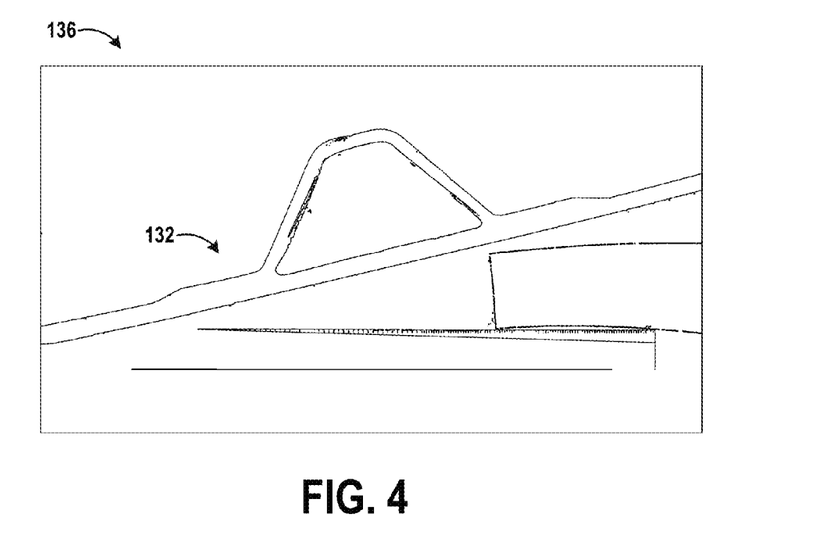
FIG. 4 illustrates an example contour image generated, according to an example embodiment.

Following creation of the thresholded binary image 130, contours at a user selected value between 0 and 1 are calculated. FIG. 4 illustrates an example contour image 136 generated. The contoured image 136 highlights the outer boundary 132 of the structure.

Figure 5:
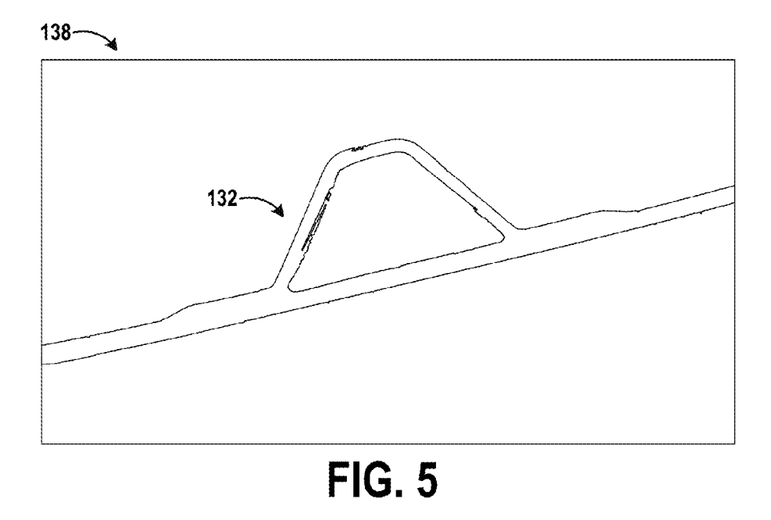
FIG. 5 illustrates an example image with the artifact filtered out of the image, according to an example embodiment.

Following, in further examples, the processor(s) 110 may further process the contour image 136 to remove the artifact 134 in the image. To do so, an area map of the contours can be calculated so that any objects or artifacts in the area map that have a size smaller than a threshold size can be removed, resulting in the area map including the outer boundary 132 of the structure 116. FIG. 5 illustrates an example image 138 with the artifact 134 filtered out of the image.

Then, once the outer boundary 132 is identified, the outer boundary 132 may be rotated so as to be in a designated orientation. For example, in some instances, the cross-section of the structure 116 is too long for the scanning device 104, and thus, the structure 116 is placed diagonally in the scanning device 104. For image processing, however, it is desirable to have the outer boundary 132 aligned with an x-axis and so the outer boundary 132 can be rotated to standardize measurement processes. Coordinates of the outer boundary 132 can be rotated using singular value decomposition (SVD) so that the outer boundary is in a consistent orientation for subsequent measurements. For example, SVD can be used to calculate the angle of rotation.

Figure 6:
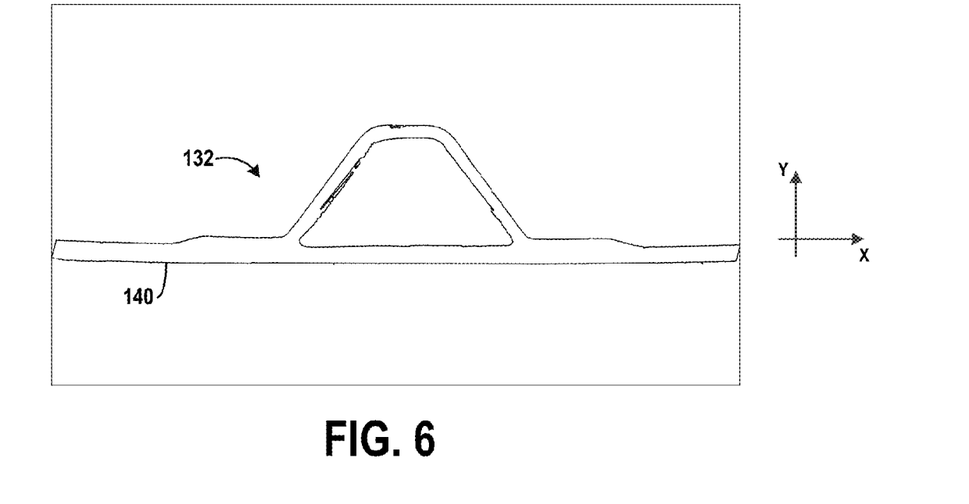
FIG. 6 illustrates an example of the outer boundary rotated to an approximate horizontal position, according to an example embodiment.

FIG. 6 illustrates an example of the outer boundary 132 rotated to an approximate horizontal position. Within this example, the outer boundary 132 of the structure 116 includes a substantially straight portion 140, and coordinates of the outer boundary 132 are rotated such that the substantially straight portion 140 is approximately horizontal along the x-axis. Thus, coordinates of the outer boundary 132 can be rotated along an x-y axis such that the substantially straight portion 140 is approximately horizontal along the x-axis.

Once the outer boundary 132 is rotated, slope processing of the outer boundary 132 can be performed, as described below with reference to FIGS. 7-10.

Figure 7:
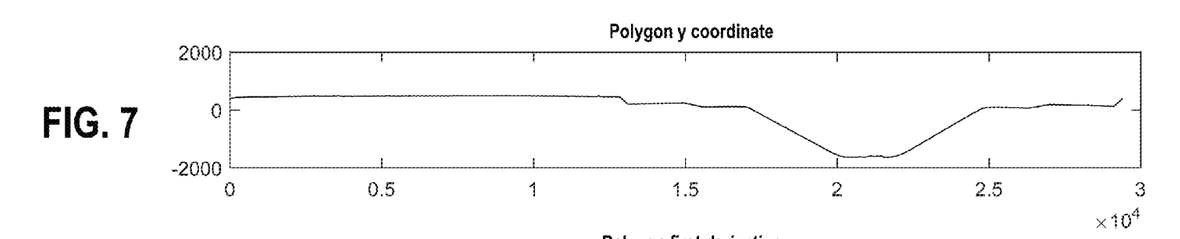
FIG. 7 illustrates an example graph of the y coordinate values of the outer boundary, according to an example embodiment.
Figure 8:
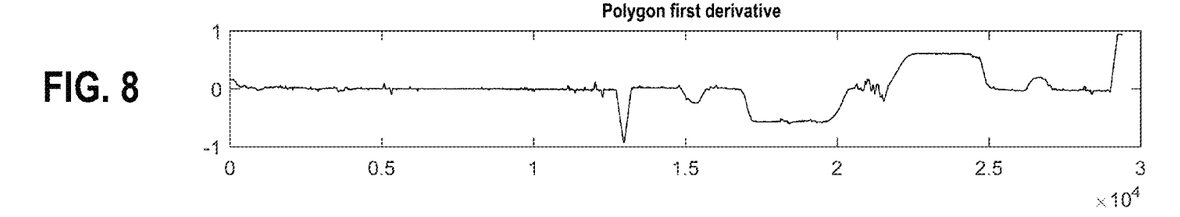
FIG. 8 illustrates an example graph of a first derivative (e.g., slope) of the outer boundary, according to an example embodiment.
Figure 9:
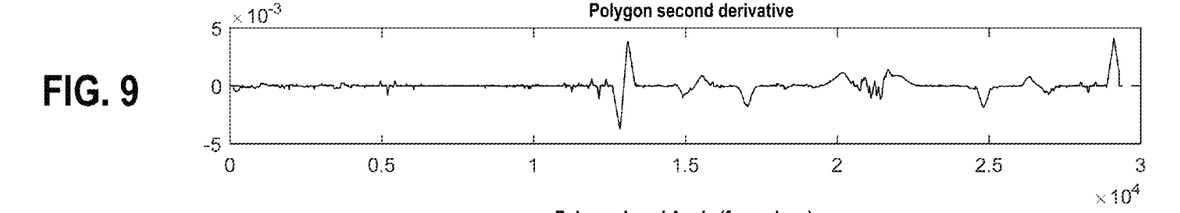
FIG. 9 illustrates an example graph of a second derivative (e.g., rate of change of the slope) of the outer boundary, according to an example embodiment.
Figure 10:
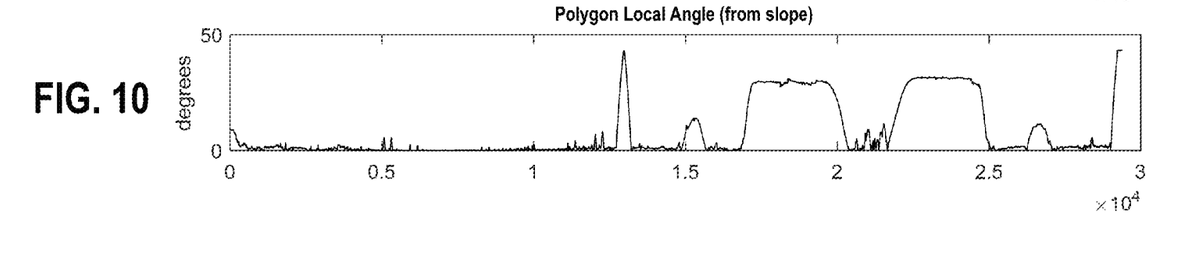
FIG. 10 illustrates an example graph of a local angle (e.g., from the slope) of the outer boundary, according to an example embodiment.

FIGS. 7-10 illustrate example graphs of aspects of slopes of the outer boundary 132. FIG. 7 illustrates an example graph of the y coordinate values of the outer boundary 132. FIG. 8 illustrates an example graph of a first derivative (e.g., slope) of the outer boundary 132. FIG. 9 illustrates an example graph of a second derivative (e.g., rate of change of the slope) of the outer boundary 132. FIG. 10 illustrates an example graph of a local angle (e.g., from the slope) of the outer boundary 132.

Figure 11:
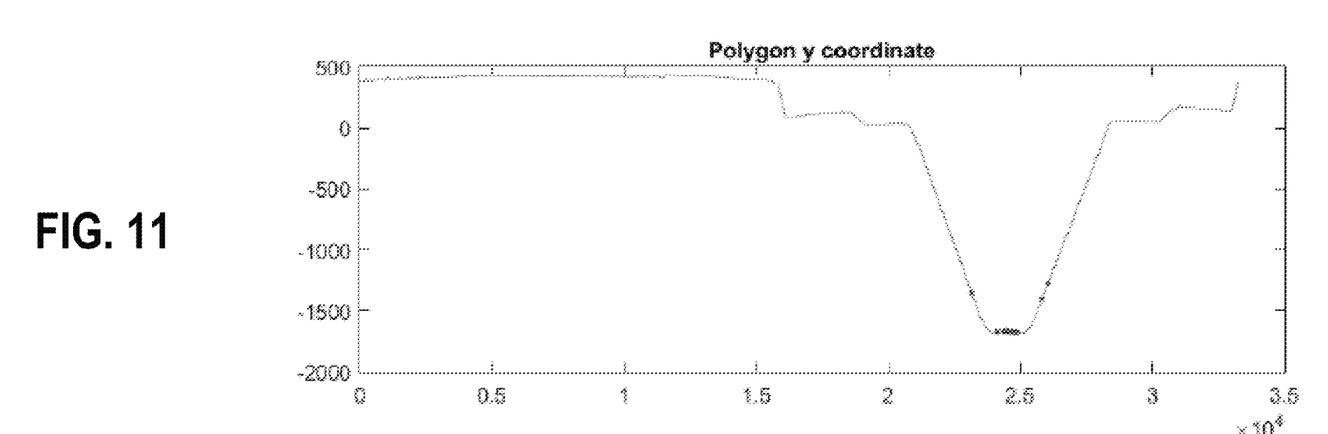
FIG. 11 illustrates an example graph of the y coordinate values of the outer boundary again, with selected points highlighted, according to an example embodiment.

Example slope processing includes first selecting points on portions of the outer boundary 132 based on the points having a first derivative or a second derivative less than a threshold. Thus, for areas of the outer boundary 132 where a rate of change of the slope is less than a threshold, those areas are selected. FIG. 11 illustrates an example graph of the y coordinate values of the outer boundary again, with selected points highlighted.

Figure 12:
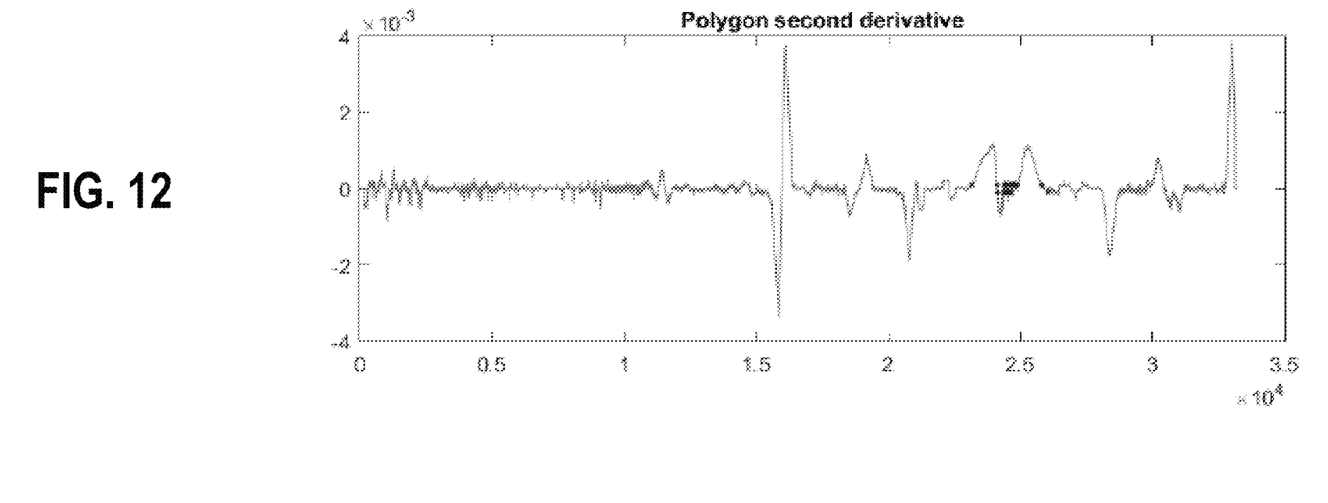
FIG. 12 illustrates an example graph of the second derivative of the outer boundary again, with the selected points highlighted, according to an example embodiment.

FIG. 12 illustrates an example graph of the second derivative of the outer boundary 132 again, with the selected points highlighted. The selected points represent areas on the outer boundary 132 that have a second derivative of approximately zero, and thus, the threshold can be +/− variations, such as close to zero (e.g., 1×10^−4). The selected points further represent areas on the outer boundary 132 that map to a slope change of a geometry feature of the outer boundary 132.

Further, points are selected based on the points having a y coordinate value less than about half a maximum y coordinate value of the rotated outer boundary. For example, referring to FIG. 11, selected points have y coordinate values at or below magnitude of about −1000 magnitude (or taken as values of an absolute value of the y coordinate).

Figure 13:
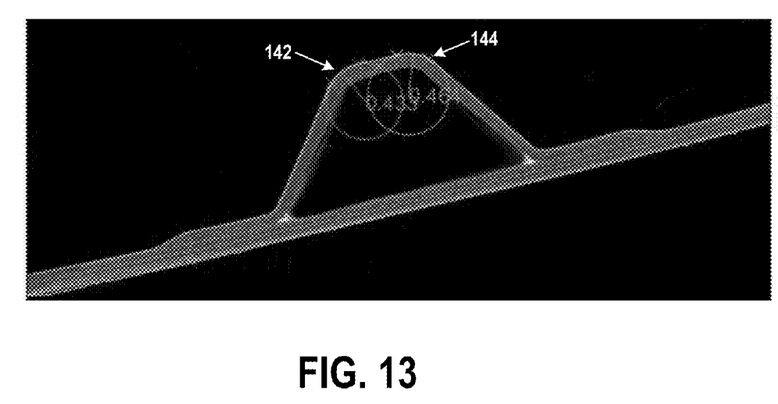
FIG. 13 illustrates an example image of the structure with radii of arc features calculated, according to an example embodiment.

Selecting points in this manner allows for measuring regions of the contour of the structure 116. FIG. 13 illustrates an example image of the structure 116 with radii of arc features calculated. It is noted that radii of arc features are only one type of geometry feature that may be calculated, as other areas on the structure 116 that have different geometry features can also be analyzed using methods described herein. The radii are calculated for any arc or curved features of contours of the structure 116. For example, curve 142 has a radius of arc calculated to be 0.433, and curve 144 has a radius of arc calculated to be 0.464.

In one example, a radius of arc (or a bended structure) is a parameter measured for stress analysis. In theory, any sets of three different points on the same arc should give the identical radius and center, and thus, the "3 points algorithm" is a common method to calculate radius if three different points on the arc are given. However, the selected points may not be exact due to rounding error or measurement noise and the 3-points algorithm is sensitive to noise.

Thus, in another example, the selected points are processed using circle arc fitting techniques. Using circle arc fitting techniques is an improvement that uses multiple points spread out at about equal distances to generate a circle for radii measurements.

Figure 14:
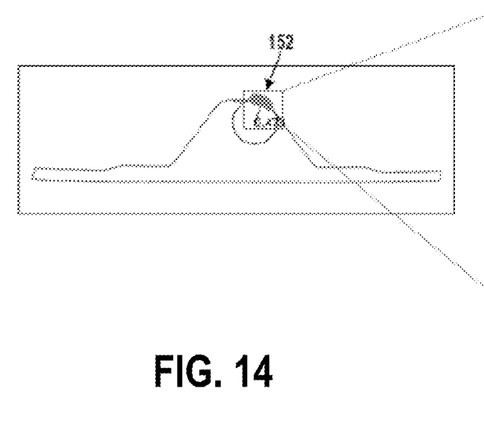
FIG. 14 illustrates a detailed view of an example of circle arc fitting the selected points of the outer boundary, according to an example embodiment.
Figure 15:
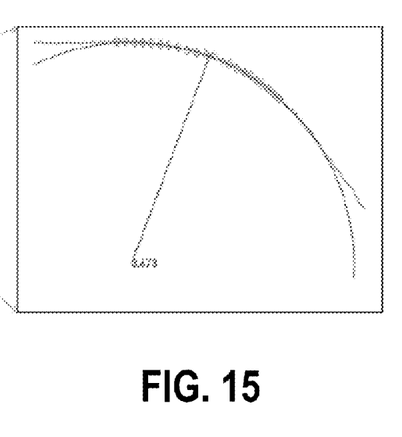
FIG. 15 illustrates a more detailed view of the example of circle arc fitting the selected points of the outer boundary, according to an example embodiment.

FIG. 14 illustrates a detailed view of an example of circle arc fitting the selected points of the outer boundary 132. FIG. 15 illustrates a more detailed view of the example of circle arc fitting the selected points of the outer boundary 132.

Example circle arc fitting techniques that may be used include constructing a curve that has a best fit to the selected points subject to constraints. Curve fitting can include either interpolation where an exact fit to the selected points is required, or smoothing, in which a "smooth" function is constructed that approximately fits the selected points.

FIGS. 16-19 illustrate examples showing sensitivity of the circle arc fitting techniques.

Figure 16:
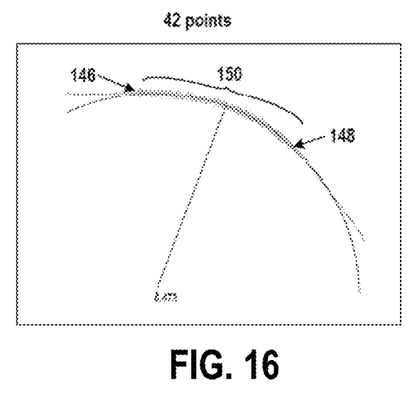
FIG. 16 illustrates circle arc fitting the selected points using 42 points along the arc of the outer boundary, according to an example embodiment.

FIG. 16 illustrates circle arc fitting the selected points using 42 points along the arc of the outer boundary 132. The 42 points here are determined to be along the arc between a first point 146 and a last point 148 among the selected points. The first and last points 146 and 148 can be selected as a beginning of the arc and an end of the arc of this portion of the outer boundary 132 that are determined due to the second derivative (e.g., rate of change of slope) being less than a threshold. Using the 42 points, the radius of curvature is determined to be 0.473. The first and last points 146 and 148 further identify a region 150 of the outer boundary.

Figure 17:
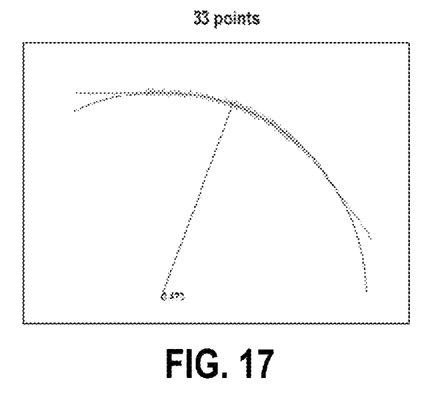
FIG. 17 illustrates circle arc fitting the selected points using 33 points along the arc of the outer boundary, according to an example embodiment.

FIG. 17 illustrates circle arc fitting the selected points using 33 points along the arc of the outer boundary 132. Using the 33 points, the radius of curvature is determined to be 0.473.

Figure 18:
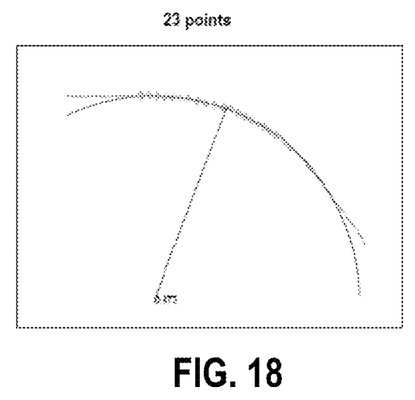
FIG. 18 illustrates circle arc fitting the selected points using 23 points along the arc of the outer boundary, according to an example embodiment.

FIG. 18 illustrates circle arc fitting the selected points using 23 points along the arc of the outer boundary 132. Using the 23 points, the radius of curvature is determined to be 0.473.

Figure 19:
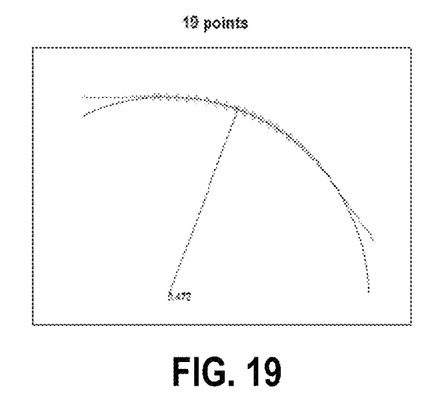
FIG. 19 illustrates circle arc fitting the selected points using 19 points along the arc of the outer boundary, according to an example embodiment.

FIG. 19 illustrates circle arc fitting the selected points using 19 points along the arc of the outer boundary 132. Using the 19 points, the radius of curvature is determined to be 0.472.

Thus, as seen, the radius of curvature that is determined varied from 0.472-0.473 using between 19-42 points for circle arc fitting. This method has been found to be more robust and less sensitive to noise in the image than using the 3-points algorithm.

Thus, once the circle arc fitting is performing, a radius of curvature of the one or more portions of the outer boundary 132 is determined.

Following, a geometry feature of the region 150 of the outer boundary 132 is identified by comparison to the stored templates 123 of geometry features of the structure 116. For example, the stored templates 123 for the structure 116 may include straight portions, circular portions, convex portions, and concave portions each of which maps to a geometry feature of the structure 116. Referring back to FIG. 14, in these examples, a geometry feature 152 may be identified by comparison to the stored templates 123 as a circular arc.

Following, a comparison of the determined radius of curvature of the geometry feature 152 is made to a specified radius of curvature for a corresponding portion of the structure 116, by reference to the manufacturing specification 122, to determine whether the structure 116 is within a manufacturing tolerance. The comparison uses expected values of the radius to determine a variance as seen in the finished part. Using this method, measurements are more consistent for all parts, and focus is on an outer boundary 132 of the cross-section of the structure 116.

Figure 20:
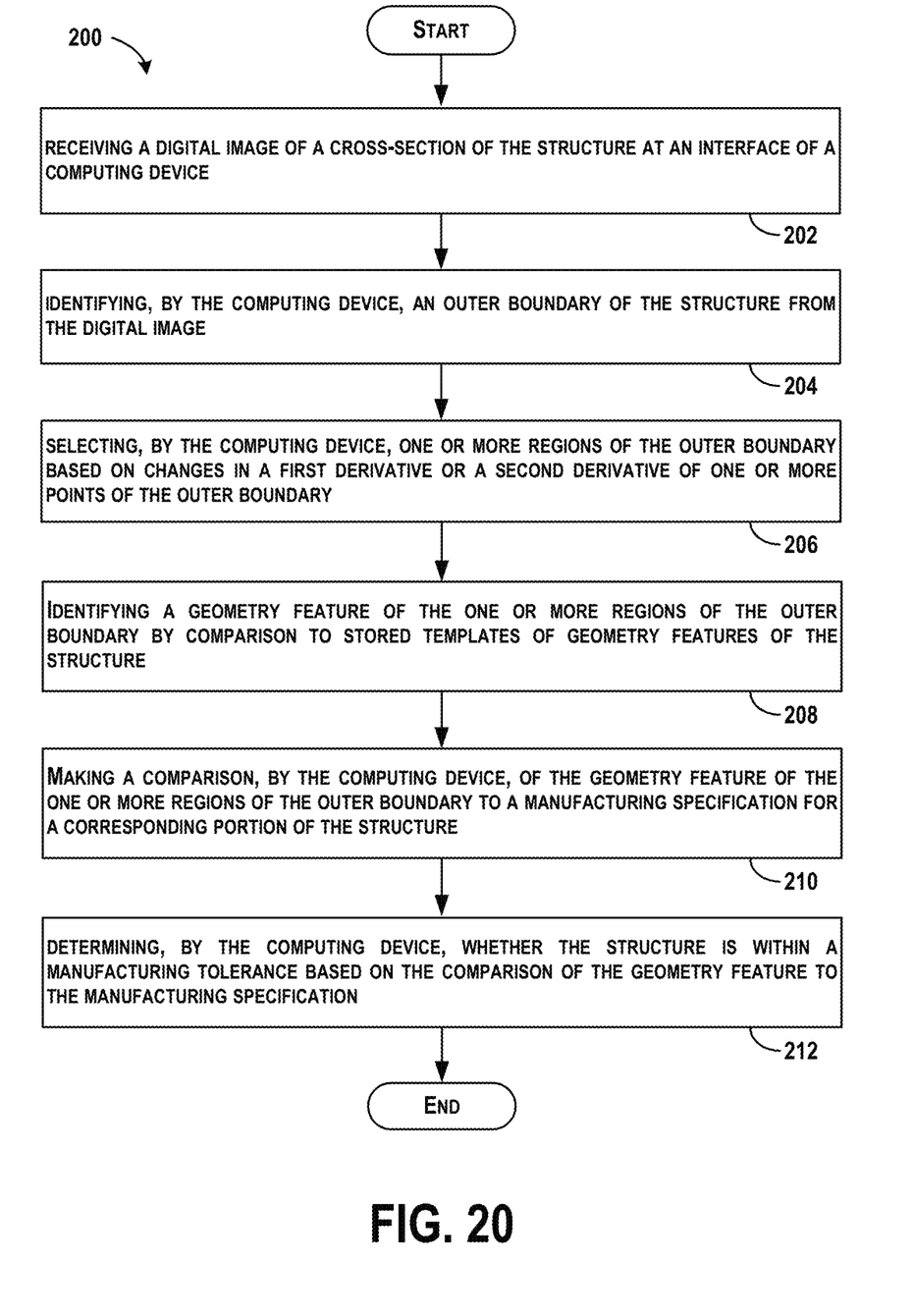
FIG. 20 shows a flowchart of an example method of validating a manufacturing tolerance of a composite structure, according to an example embodiment.

FIG. 20 shows a flowchart of an example method 200 of validating a manufacturing tolerance of a composite structure, according to an example embodiment. Method 200 shown in FIG. 20 presents an embodiment of a method that could be used with the system 100 shown in FIG. 1, for example, and may be performed by the system 100. Further, devices or systems may be used or configured to perform logical functions presented in FIG. 20. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-212. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 20 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes receiving the digital image 118 of a cross-section of the structure 116 at the interface 108 of the computing device 102. Within examples, the structure 116 can be optically scanned to create the digital image 118.

At block 204, the method 200 includes identifying, by the computing device 102, the outer boundary 132 of the structure 116 from the digital image 118.

At block 206, the method 200 includes selecting, by the computing device 102, selecting, by the computing device 102, one or more regions 150 of the outer boundary 132 based on changes in a first derivative or a second derivative of one or more points 146 and 148 of the outer boundary 132. For example, the points 146 and 148 are selected as first and last points along an area of the outer boundary 132 that satisfy the first derivative or the second derivative change, and an area between the points 146 and 148 is identified as the region 150 that is selected to be analyzed. In a specific example, the first point 146 of the one or more points of the outer boundary 132 having the changes in the first derivative or the second derivative is used as a starting point of the region 150, and the second point 148 of the one or more points of the outer boundary 132 having the changes in the first derivative or the second derivative is used as an ending point of the region 150.

At block 208, the method 200 includes identifying the geometry feature 152 of the one or more regions 150 of the outer boundary 132 by comparison to stored templates 123 of geometry features of the structure 116. In some examples, to identify the geometry feature 152, a radius of curvature of the region 150 of the outer boundary 132 is determined. In other examples, to identify the geometry feature 152, a slope of the outer boundary 132 is processed to identify the changes in the first derivative.

In yet further examples, to identify the geometry feature 152, coordinates of the outer boundary 132 of the structure 116 can be rotated such that the outer boundary 132 is in a specified orientation, and then a slope of the rotated outer boundary 132 can be processed. Further, the points 146 and 148 on the outer boundary 132 can be selected based also on a mapping of slope change of the outer boundary 132 to the geometry feature 152.

Coordinates of the outer boundary 132 of the structure 116 can be rotated using SVD. In another example, the outer boundary 132 of the structure 116 includes a substantially straight portion 140, and coordinates of the outer boundary 132 can be rotated such that the substantially straight portion 140 is approximately horizontal. Rotation can be along an x-y axis such that the substantially straight portion 140 is approximately horizontal along the x-axis, and selecting the points on the rotated outer boundary 132 can be based also on the points having a y coordinate value less than about half a maximum y coordinate value (i.e., absolute value) of the rotated outer boundary 132.

At block 210, the method 200 includes making a comparison, by the computing device 102, of the geometry feature 152 of the one or more regions 150 of the outer boundary 132 to the manufacturing specification 122 for a corresponding portion of the structure 116.

At block 212, the method 200 includes determining, by the computing device 102, whether the structure 116 is within a manufacturing tolerance based on the comparison of the geometry feature 152 to the manufacturing specification 122. Example manufacturing tolerances include being within +/−1% to 2% of design specifications. This may include verifying that a geometry of a surface contour of the structure 116 substantially matches a manufacturing specification for the structure 116.

Figure 21:
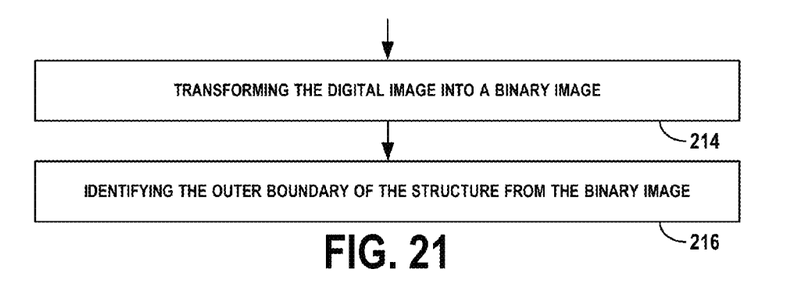
FIG. 21 shows a flowchart of an example method for use with the method shown in FIG. 20, according to an example embodiment.

FIG. 21 shows a flowchart of an example method for use with the method 200, according to an example embodiment. At block 214, functions include transforming the digital image 118 into a binary image 130. At block 216, functions include identifying the outer boundary 132 of the structure 116 from the binary image 130.

Figure 22:
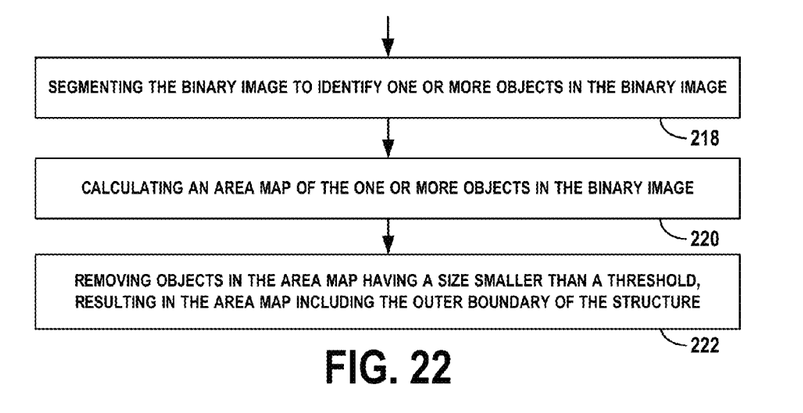
FIG. 22 shows a flowchart of an example method for use with the method shown in FIG. 20, according to an example embodiment.

FIG. 22 shows a flowchart of an example method for use with the method 200, according to an example embodiment. At block 218, functions include segmenting the binary image 130 to identify one or more objects in the binary image 130. At block 220, functions include calculating an area map of the one or more objects in the binary image 130. At block 222, functions include removing objects in the area map having a size smaller than a threshold, resulting in the area map including the outer boundary 132 of the structure 116.

Figure 23:
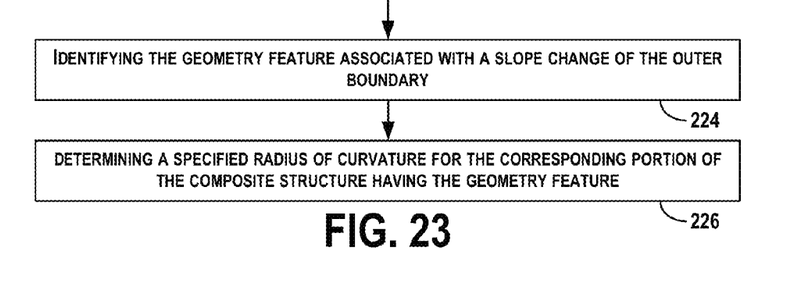
FIG. 23 shows a flowchart of an example method for use with the method shown in FIG. 20, according to an example embodiment.

FIG. 23 shows a flowchart of an example method for use with the method 200, according to an example embodiment. At block 224, functions include identifying the geometry feature 152 associated with a slope change of the outer boundary 132. At block 226, functions include determining the specified radius of curvature for the corresponding portion of the structure 116 having the geometry feature 152.

Figure 24:
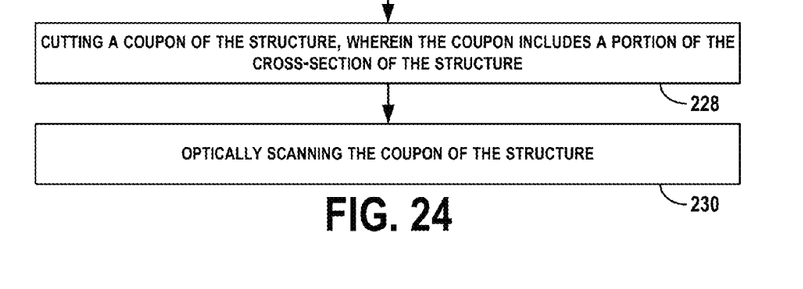
FIG. 24 shows a flowchart of an example method for use with the method shown in FIG. 20, according to an example embodiment.

FIG. 24 shows a flowchart of an example method for use with the method 200, according to an example embodiment. At block 228, functions include cutting a coupon of the structure 116, and the coupon includes a portion of the cross-section of the structure 116. At block 230, functions include optically scanning the coupon of the structure 116.

Example methods and systems described enable automated extraction of the outer boundary 132 of a coupon of the structure 116, slope processing of the outer boundary 132 to identify regions of interest for measurement, and circle arc fitting to allow for measuring radii of features of the structure 116. Using these methods reduces variability in measurements, and reduces a time of analysis. Furthermore, such methods enable verifying conformance of a composite part's shape and/or contour to a manufacturing specification.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of validating a manufacturing tolerance of a structure, comprising:
    receiving a digital image of a cross-section of the structure at an interface of a computing device;
    identifying, by the computing device, an outer boundary of the structure from the digital image;
    selecting, by the computing device, one or more regions of the outer boundary based on changes in a first derivative or a second derivative of one or more points of the outer boundary;
    identifying a geometry feature of the one or more regions of the outer boundary by processing a slope of the outer boundary to identify the changes in the first derivative and comparing to stored templates of geometry features of the structure;
    making a comparison, by the computing device, of the geometry feature of the one or more regions of the outer boundary to a manufacturing specification for a corresponding portion of the structure; and
    determining, by the computing device, whether the structure is within a manufacturing tolerance based on the comparison of the geometry feature to the manufacturing specification.

2. The method of claim 1, wherein receiving the digital image of the structure comprises optically scanning the structure to create the digital image.

3. The method of claim 1, wherein selecting the one or more regions of the outer boundary based on changes in the first derivative or the second derivative of one or more points of the outer boundary comprises:
    using a first point of the one or more points of the outer boundary having the changes in the first derivative or the second derivative as a starting point of the one or more regions; and
    using a second point of the one or more points of the outer boundary having the changes in the first derivative or the second derivative as an ending point of the one or more regions.

4. The method of claim 1, wherein identifying the geometry feature of the one or more regions of the outer boundary comprises:
    determining a radius of curvature of the one or more regions of the outer boundary.

5. The method of claim 1, wherein identifying the geometry feature of the one or more regions of the outer boundary comprises:
    selecting the one or more points on the outer boundary based also on a mapping of slope change of the outer boundary to the geometry feature.

6. The method of claim 1, wherein identifying the geometry feature of the one or more regions of the outer boundary comprises:
    rotating coordinates of the outer boundary of the structure such that the outer boundary is in a specified orientation; and
    processing a slope of the rotated outer boundary.

7. The method of claim 1, wherein the outer boundary of the structure includes a substantially straight portion, and wherein identifying the geometry feature of the one or more regions of the outer boundary comprises:
    rotating coordinates of the outer boundary of the structure such that the substantially straight portion is approximately horizontal; and
    processing a slope of the rotated outer boundary.

8. The method of claim 1, further comprising:
    transforming the digital image into a binary image; and
    identifying the outer boundary of the structure from the binary image.

9. The method of claim 8, further comprising:
    segmenting the binary image to identify one or more objects in the binary image;
    calculating an area map of the one or more objects in the binary image; and
    removing objects in the area map having a size smaller than a threshold, resulting in the area map including the outer boundary of the structure.

10. The method of claim 1, further comprising:
    identifying the geometry feature associated with a slope change of the outer boundary; and
    determining a specified radius of curvature for the corresponding portion of the structure having the geometry feature.

11. The method of claim 1, further comprising:
    cutting a coupon of the structure, wherein the coupon includes a portion of the cross-section of the structure; and
    optically scanning the coupon of the structure.

12. A non-transitory computer readable storage medium having stored therein instructions, that when executed by a computing device having one or more processors, causes the computing device to perform functions comprising:
    receiving a digital image of a cross-section of the structure at an interface of a computing device;
    identifying, by the computing device, an outer boundary of the structure from the digital image;
    selecting, by the computing device, one or more regions of the outer boundary based on changes in a first derivative or a second derivative of one or more points of the outer boundary;
    identifying a geometry feature of the one or more regions of the outer boundary by processing a slope of the outer boundary to identify the changes in the first derivative and comparing to stored templates of geometry features of the structure;
    making a comparison, by the computing device, of the geometry feature of the one or more regions of the outer boundary to a manufacturing specification for a corresponding portion of the structure; and determining, by the computing device, whether the structure is within a manufacturing tolerance based on the comparison of the geometry feature to the manufacturing specification.

13. The non-transitory computer readable storage medium of claim 12, wherein the outer boundary of the structure includes a substantially straight portion, and wherein the function of identifying the geometry feature of the one or more regions of the outer boundary comprises:

rotating coordinates of the outer boundary of the structure such that the substantially straight portion is approximately horizontal; and processing a slope of the rotated outer boundary.

14. The non-transitory computer readable storage medium of claim 12, wherein the functions further comprise:

transforming the digital image into a binary image; and identifying the outer boundary of the structure from the binary image.

15. A system for validating a manufacturing tolerance of a structure, comprising:

one or more processors; and data storage storing instructions executable by the one or more processors for performing functions comprising:

receiving a digital image of a cross-section of the structure;

identifying an outer boundary of the structure from the digital image;

selecting one or more regions of the outer boundary based on changes in a first derivative or a second derivative of one or more points of the outer boundary;

identifying a geometry feature of the one or more regions of the outer boundary by processing a slope of the outer boundary to identify the changes in the first derivative and comparing to stored templates of geometry features of the structure;

making a comparison of the geometry feature of the one or more regions of the outer boundary to a manufacturing specification for a corresponding portion of the structure; and determining whether the structure is within a manufacturing tolerance based on the comparison of the geometry feature to the manufacturing specification.

16. The system of claim 15, further comprising:

a scanning device for optically scanning the structure to create the digital image.

17. The system of claim 15, wherein the one or more processors further execute the instructions stored in the data storage for verifying that a geometry of a surface contour of the structure substantially matches the manufacturing specification for the structure.

18. The system of claim 15, wherein the one or more processors further execute the instructions stored in the data storage for determining a radius of curvature of the one or more regions of the outer boundary.

* * * * *